(12) United States Patent
Li (10) Patent No.: US 9,298,224 B2
(45) Date of Patent: Mar. 29, 2016

(54) ELECTRONIC DEVICE ENCLOSURE

(71) Applicant: ScienBiziP Consulting (Shen Zhen) Co., Ltd., Shenzhen (CN)

(72) Inventor: Zhan-Yang Li, Shenzhen (CN)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 115 days.

(21) Appl. No.: 14/256,130

(22) Filed: Apr. 18, 2014

(65) Prior Publication Data

US 2014/0347832 A1  Nov. 27, 2014

(30) Foreign Application Priority Data

May 23, 2013  (CN) .......................... 2013 1 01930338

(51) Int. Cl.
| | | |
|---|---|---|
| G06F 1/16 | (2006.01) | |
| G06F 1/18 | (2006.01) | |
| E05B 65/00 | (2006.01) | |
| E05C 1/04 | (2006.01) | |
| H05K 5/00 | (2006.01) | |
| H05K 7/00 | (2006.01) | |

(52) U.S. Cl.
CPC ............... G06F 1/18 (2013.01); E05B 65/006 (2013.01); E05C 1/04 (2013.01); G06F 1/184 (2013.01)

(58) Field of Classification Search
CPC .................. G06F 1/16; G06F 1/1601–1/1611; G06F 1/1613–1/1698; G06F 1/18–1/189; H05K 5/00–5/069; H05K 7/00–7/186
USPC ............. 361/679.01–679.45, 679.55–679.61, 361/679.26–679.3, 679.31–679.39, 361/724–730, 741, 748–752, 756, 686, 687, 361/688, 696, 697, 787, 789, 794, 701–703, 361/709, 807–810; 455/575.1–575.9; 349/56–60; 312/223.1–223.3; 348/787, 348/789, 794

See application file for complete search history.

(56) References Cited

U.S. PATENT DOCUMENTS

| | | | | | |
|---|---|---|---|---|---|
| 5,897,400 | A | * | 4/1999 | Amberg ................. | G06F 1/181 439/347 |
| 6,141,209 | A | * | 10/2000 | Kerrigan ................. | G06F 1/20 312/194 |
| 6,257,682 | B1 | * | 7/2001 | Liu ......................... | G06F 1/184 312/223.2 |
| 6,351,376 | B1 | * | 2/2002 | Liang ..................... | G06F 1/187 248/222.11 |
| 6,476,883 | B1 | * | 11/2002 | Salimes ................. | H05K 5/0017 345/156 |
| 9,179,572 | B2 | * | 11/2015 | Li ........................... | H05K 7/1487 |
| 2003/0210520 | A1 | * | 11/2003 | Chien ..................... | G06F 1/187 361/679.33 |
| 2004/0042193 | A1 | * | 3/2004 | Kirner ..................... | H05K 7/142 361/797 |
| 2004/0085725 | A1 | * | 5/2004 | Liu ......................... | G06F 1/184 361/679.39 |
| 2004/0201962 | A1 | * | 10/2004 | Lao ......................... | G06F 1/184 361/695 |
| 2005/0094369 | A1 | * | 5/2005 | Chen ..................... | G06F 1/184 361/679.31 |

(Continued)

*Primary Examiner* — Anthony Haughton
*Assistant Examiner* — Razmeen Gafur
(74) *Attorney, Agent, or Firm* — Novak Druce Connolly Bove + Quigg LLP (57) ABSTRACT

Electronic device enclosure includes a base plate, a bracket, and a sliding pole slidably mounted to the bracket. The base plate includes a number of protrusion portions. A locking hole is defined in each of the number of protrusion portions. The locking hole includes two opposite first sides and two opposite second sides. A resisting block extends from the sliding pole. The resisting block includes two opposite third sides and two opposite fourth sides. The third sides are aligned to the corresponding first sides. The resisting block is passed through and rotated in the locking hole. The third sides are misaligned to the corresponding first sides. The resisting block is locked in the locking hole to mount the bracket to the base plate.

17 Claims, 7 Drawing Sheets

(56) References Cited

U.S. PATENT DOCUMENTS

| | | | | |
|---|---|---|---|---|
| 2005/0104863 A1* | 5/2005 | Kroll | G06F 1/181 | 345/173 |
| 2005/0258721 A1* | 11/2005 | Hung | H05K 7/1491 | 312/223.1 |
| 2005/0276012 A1* | 12/2005 | Chen | G06F 1/187 | 361/673.33 |
| 2006/0209508 A1* | 9/2006 | Han | G06F 1/184 | 361/679.37 |
| 2007/0014086 A1* | 1/2007 | Kim | G06F 1/187 | 361/679.36 |
| 2007/0153466 A1* | 7/2007 | Chen | G06F 1/187 | 361/679.31 |
| 2007/0235625 A1* | 10/2007 | Liang | G06F 1/187 | 248/675 |
| 2009/0091893 A1* | 4/2009 | Chen | G11B 33/124 | 361/726 |
| 2009/0149044 A1* | 6/2009 | Lee | G11B 33/121 | 439/79 |
| 2011/0073731 A1* | 3/2011 | Li | G06F 1/183 | 248/231.81 |
| 2011/0101832 A1* | 5/2011 | Tang | G06F 1/183 | 312/223.1 |
| 2011/0233349 A1* | 9/2011 | Zhou | G06F 1/181 | 248/122.1 |
| 2011/0284705 A1* | 11/2011 | Chang | G11B 33/124 | 248/201 |
| 2011/0292620 A1* | 12/2011 | Hayashi | H05K 7/1489 | 361/748 |

* cited by examiner

ELECTRONIC DEVICE ENCLOSURE

FIELD

The present disclosure relates to an electronic device enclosure for mounting brackets.

BACKGROUND

Electronic devices, such as personal computers and servers, have brackets to fix expansion cards and storage apparatuses therein.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
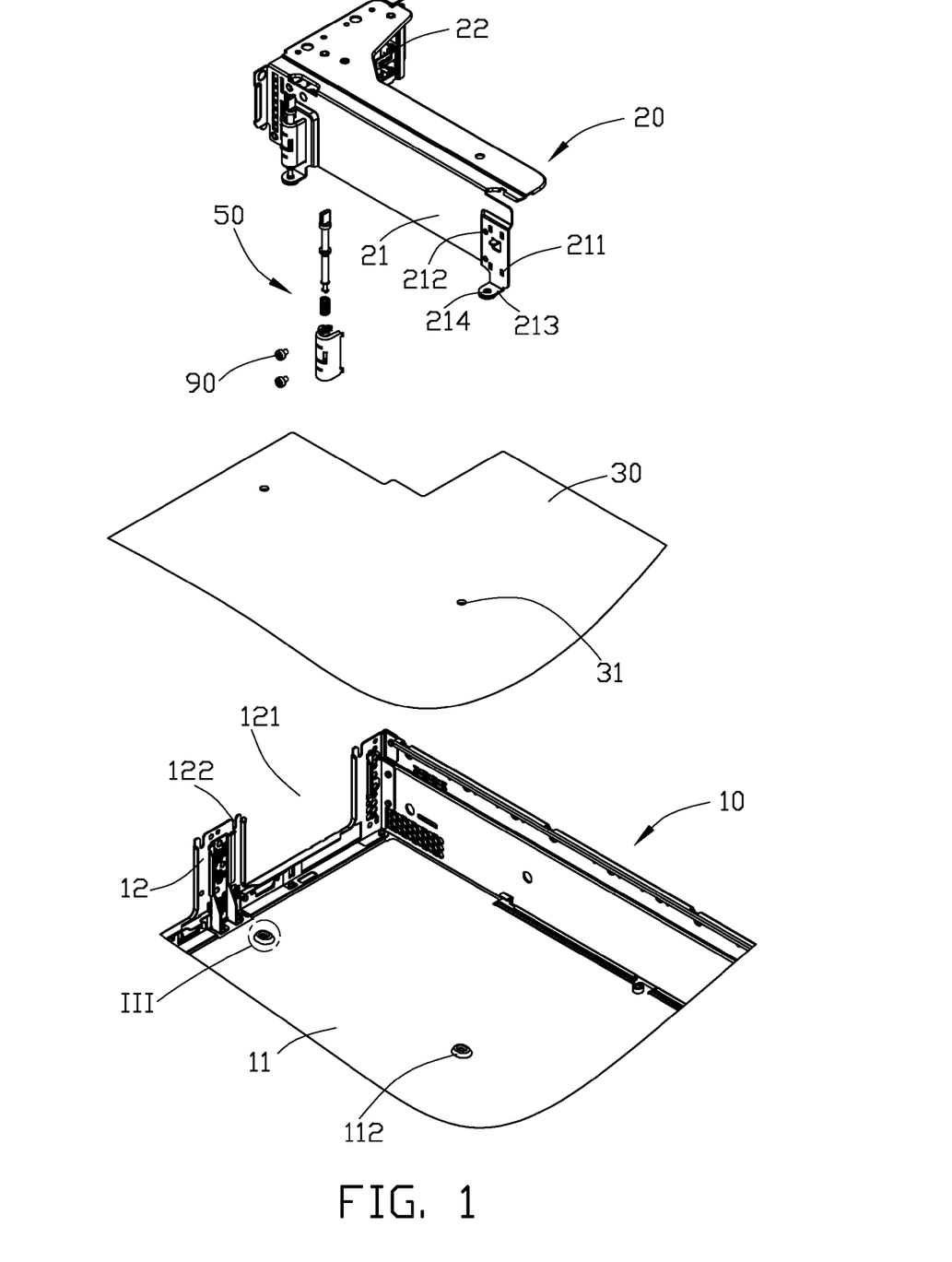
FIG. 1 is an exploded perspective view of an embodiment of an electronic device enclosure, viewed from one aspect.

FIG. 1 illustrates an enclosure 10 and a bracket 20 mounted on the enclosure 10.

Figure 2:
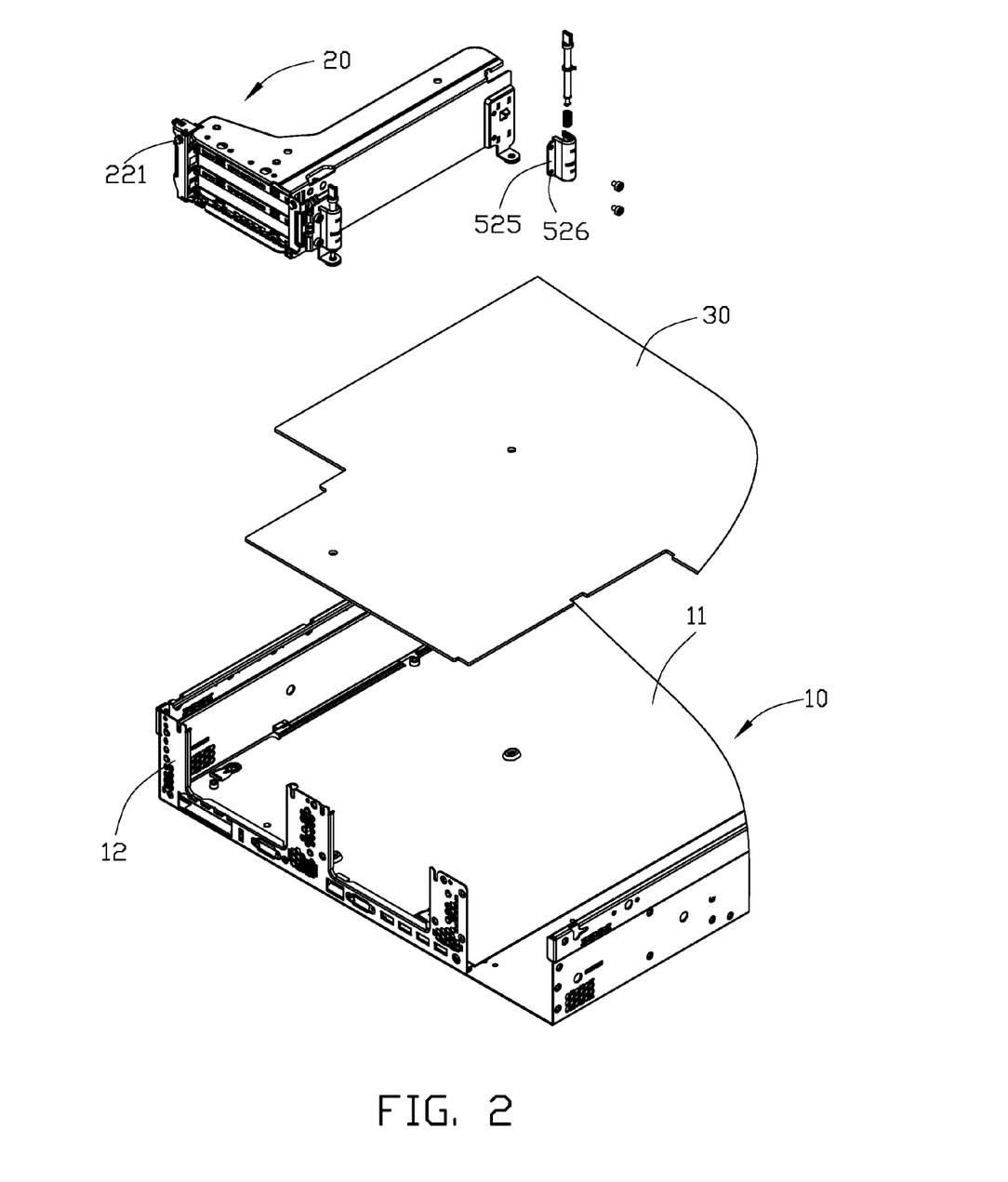
FIG. 2 is the exploded perspective view of the electronic device enclosure of FIG. 1, viewed from another aspect.
Figure 3:
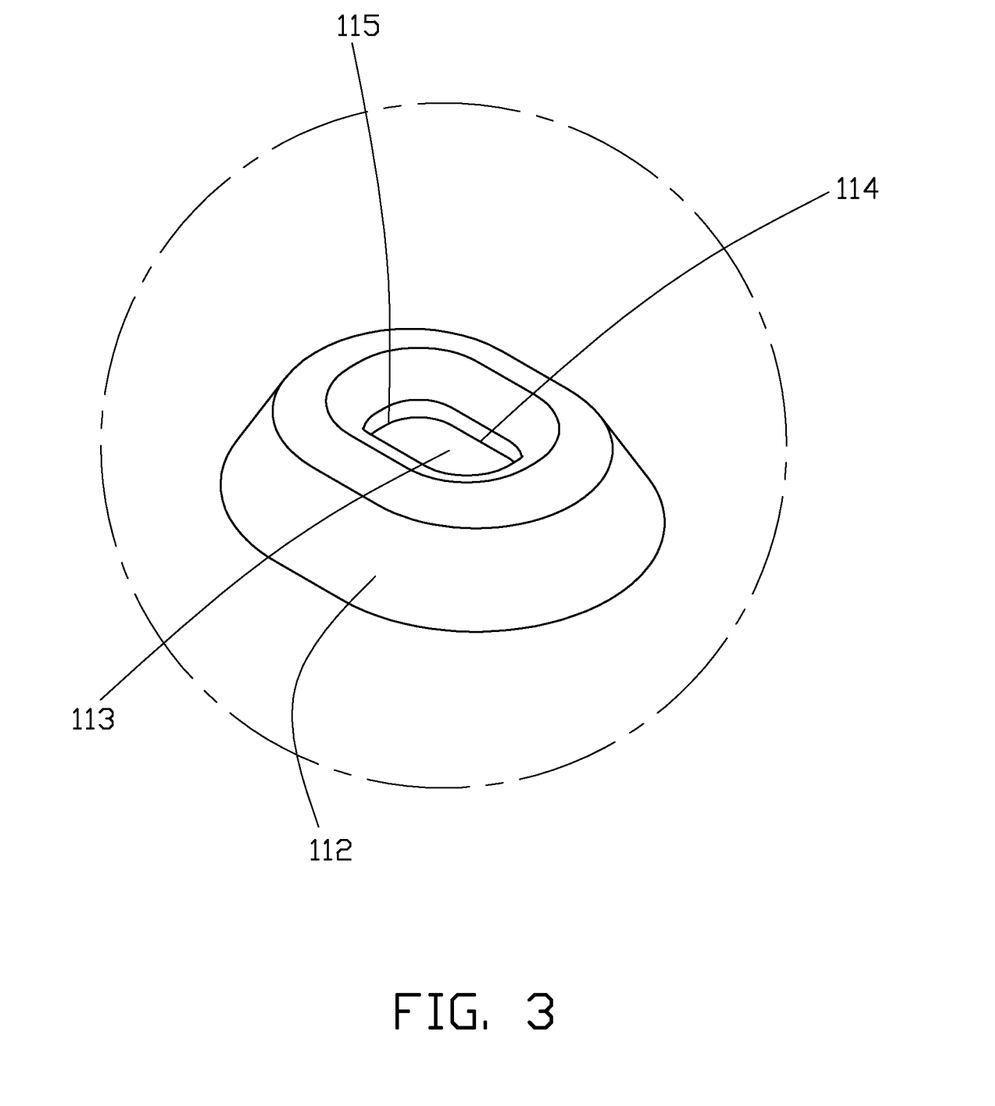
FIG. 3 is an enlarged perspective view of a circled portion III of FIG. 1.

FIGS. 1-3 illustrate that the enclosure 10 includes a base plate 11 and a side plate 12 substantially perpendicularly connected to the base plate 11. A number of protrusion portions 112 are located on the base plate 11 to support a circuit board 30. A locking hole 113 is defined in a middle portion of each of the number of protrusion portions 112. The locking hole 113 is bound by two opposite first sides 114 and two opposite second sides 115. In one embodiment, a length of each of the two first sides 114 is greater than a length of each of the two second sides 115. Two first through holes 31 are defined in the circuit board 30. An opening 121 is defined in the side plate 12. Two cutouts 122 are defined in the side plate 12 at opposite sides of the opening 121.

The bracket 20 includes a first body 21 and a second body 22 substantially perpendicularly connected to the first body 21. Two locking portions 221 are located on the second body 22. Two locking members 50 are fixed on the first body 21. Four locating holes 211 and two mounting holes 212 are defined in the first body 21. The first body 21 includes a bending tab 213. The bending tab 213 defines a second through hole 214. The bending tab 213 is substantially perpendicularly connected to a bottom edge of the first body 21.

Figure 4:
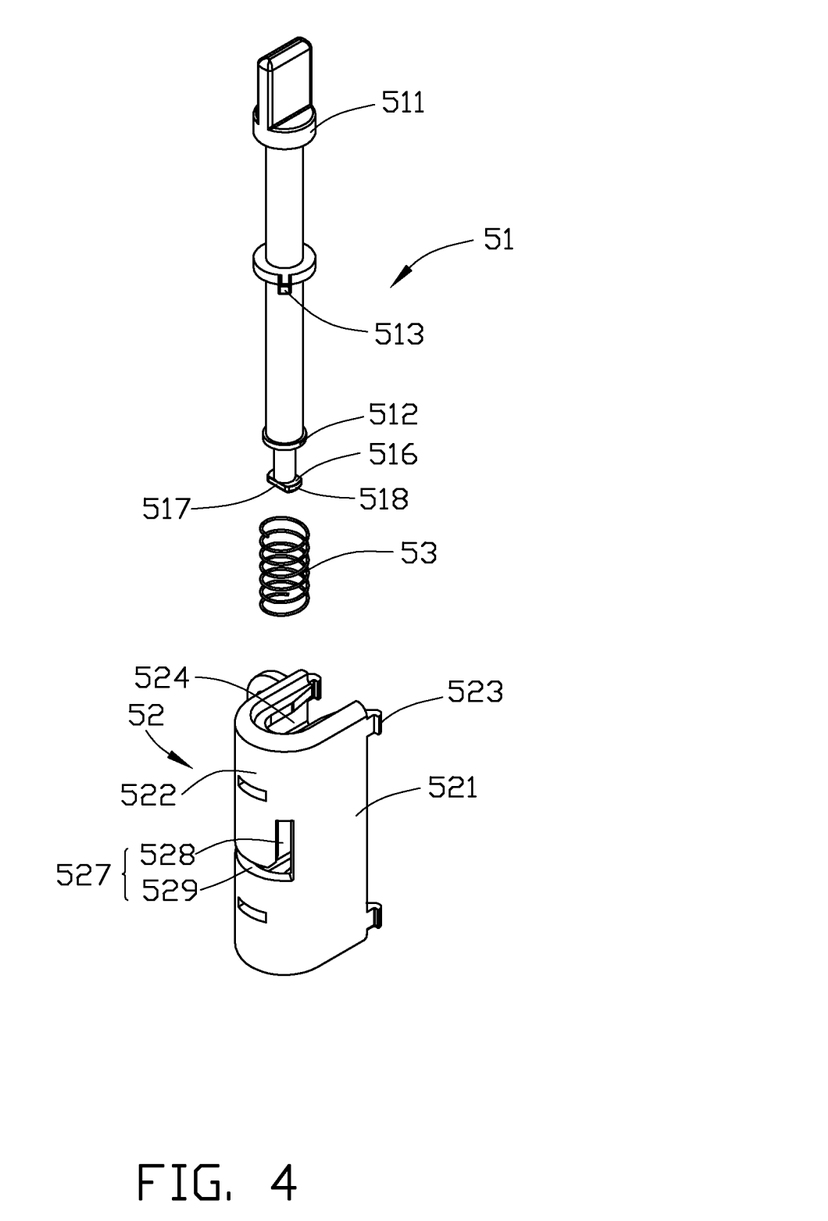
FIG. 4 is an exploded perspective view of a locking member of FIG. 1.
Figure 5:
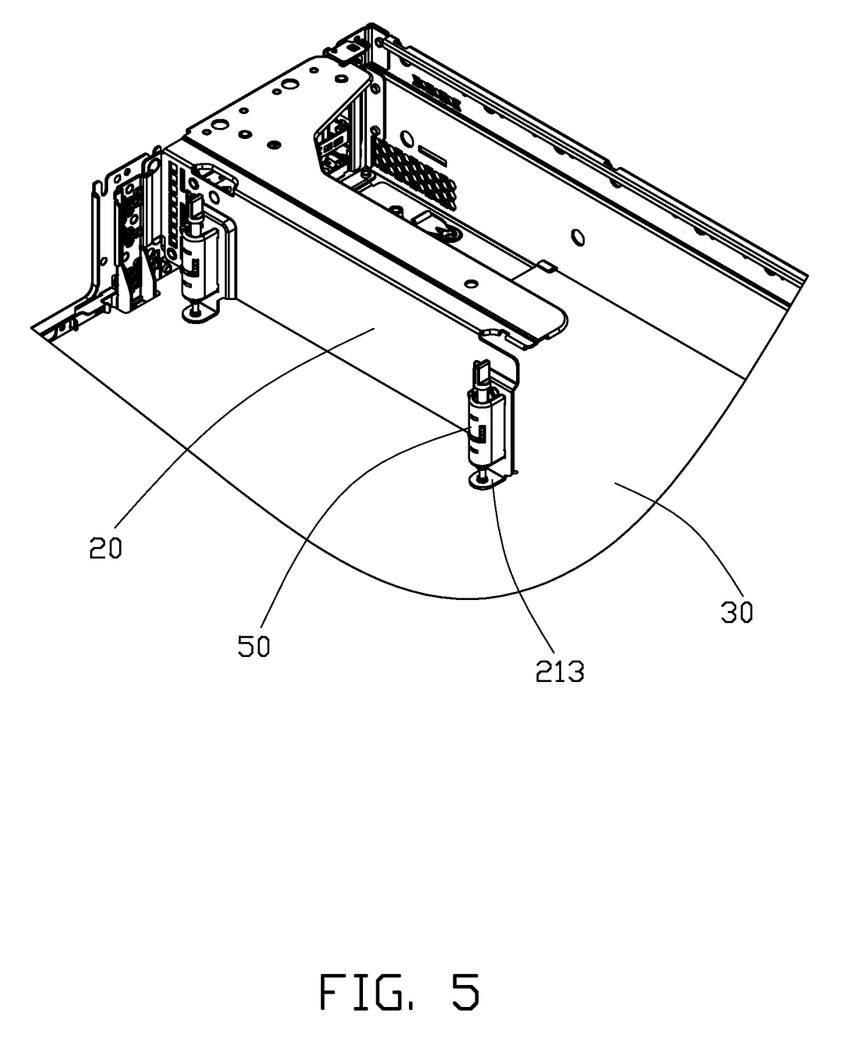
FIG. 5 is an assembled perspective view of the electronic device enclosure of FIG. 1, viewed from one aspect.
Figure 6:
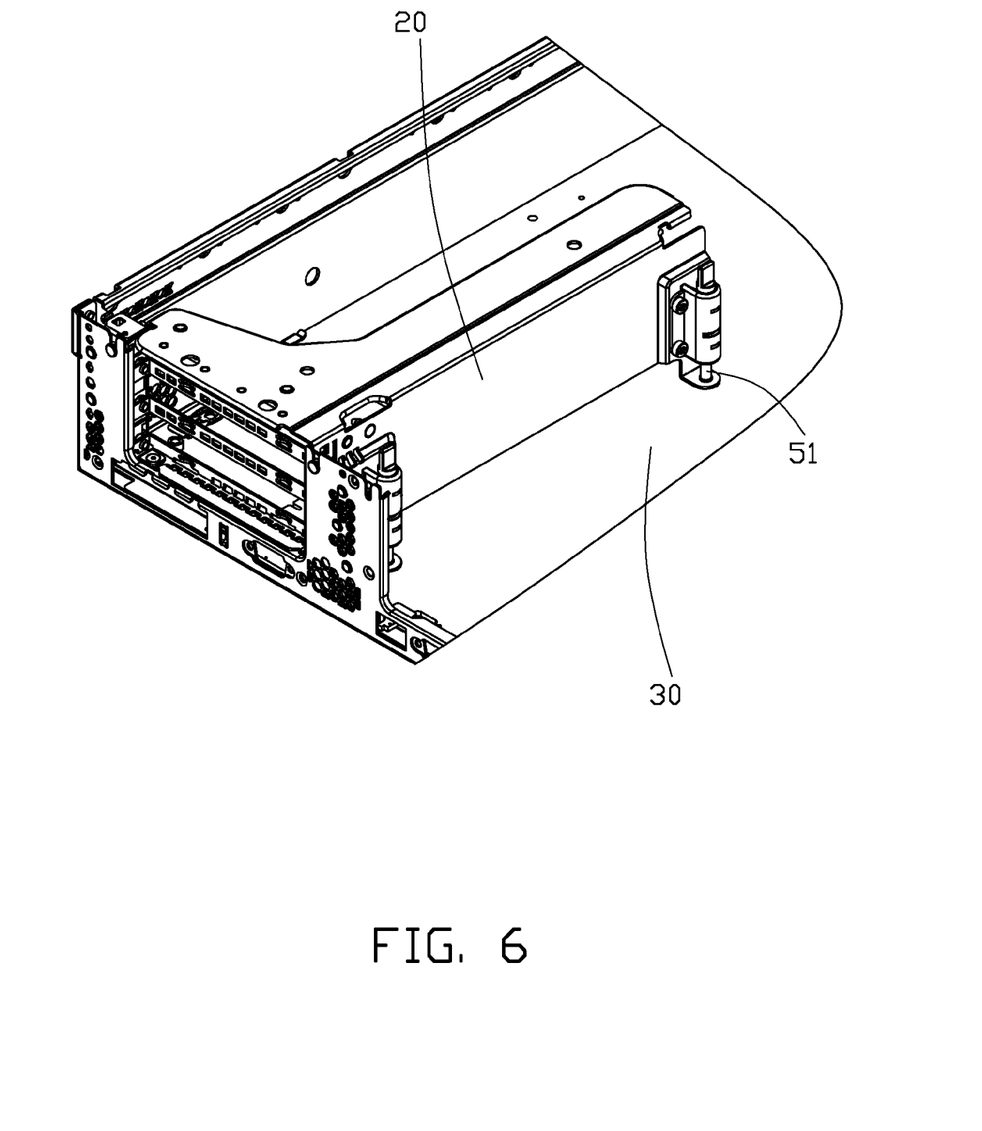
FIG. 6 is an assembled perspective view of the electronic device enclosure of FIG. 1, viewed from another aspect.
Figure 7:
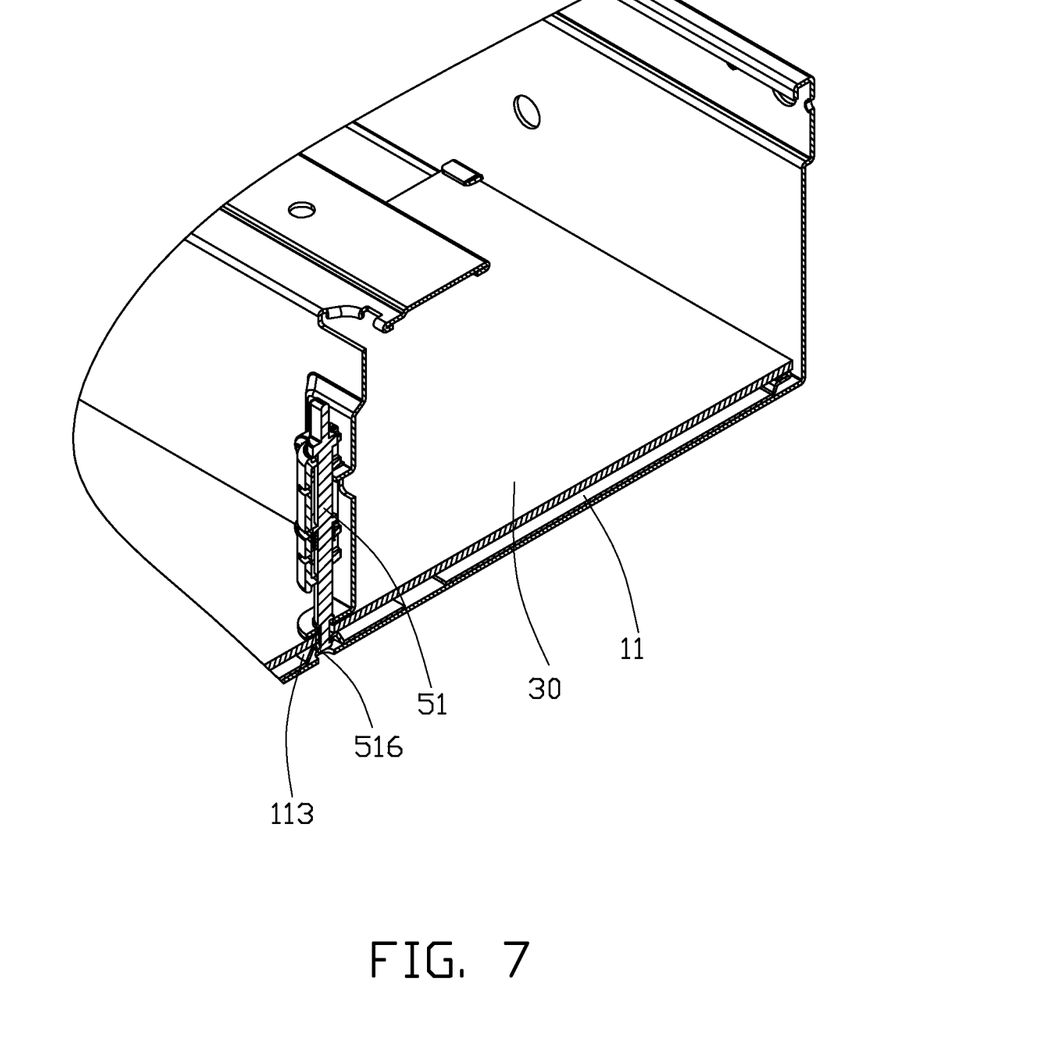
FIG. 7 shows the electronic device enclosure of FIG. 6 from another angle.

FIG. 4 illustrates that each of the two locking members 50 includes a sliding pole 51, a duct 52, and a spring 53. An annular first limiting portion 511 protrudes from an upper portion of the sliding pole 51. An annular second limiting portion 512 protrudes from a lower portion of the sliding pole 51. A limiting block 513 protrudes from a middle portion of the sliding pole 51. In one embodiment, a diameter of the second limiting portion 512 is greater than a diameter of the second through hole 214.

A resisting block 516 extends from a distal end of the sliding pole 51. The resisting block 516 includes two opposite third sides 517 and two opposite fourth sides 518. In one embodiment, a length of each of the two third sides 517 is less than the length of each of the first sides 114. The length of each of the third sides 517 is greater than the length of each of the second sides 115. A length of each of the fourth sides 518 is less than the length of each of the second sides 115.

FIGS. 2 and 4 illustrate that the duct 52 includes two upright portions 521 substantially parallel to each other, and a connecting portion 522 connected to the two upright portions 521. Each upright portion 521 includes two hook 523 located on a side edge thereof. The two upright portions 521 and the connecting portion 522 cooperatively form an accommodating space 524 therebetween. A mounting tab 525 extends from one of the two upright portions 521. Two fixing holes 526 are defined in the mounting tab 525. A sliding slot 527 is defined in the connecting portion 522. The sliding slot 527 includes an inserting portion 528 and a sliding portion 529. The inserting portion 528 and the sliding portion 529 communicate with each other. In one embodiment, an outer surface of the connecting portion 522 is substantially arc-shaped. A width between the two upright portions 521 is less than a diameter of the first limiting portion 511. The sliding slot 527 is substantially L-shaped.

FIGS. 1-7 illustrate that in coupling of each duct 52 to the bracket 20, the spring 53 is mounted to the lower portion of the sliding pole 51, such that an upper portion of the spring 53 resists against the limiting block 513. The sliding pole 51 is received in the accommodating space 524 of the duct 52. The limiting block 513 extends through the inserting portion 528 of the sliding slot 527. The first limiting portion 511 and the second limiting portion 512 of the sliding pole 51 extend out of the duct 52. The first limiting portion 511 extends out of a first end of the duct 52, and the second limiting portion 512 extends out of a second end of the duct 52.

The hooks 523 of the duct 52 are received in the corresponding locating holes 211 of the bracket 20. The fixing holes 526 are aligned to the corresponding mounting holes 212. A number of fastening members 90 extends through the fixing holes 526 and the mounting holes 212 correspondingly. Thus, the ducts 52 are fixed on the bracket 20, and the resisting blocks 516 of the sliding poles 51 are aligned to the corresponding second through holes 214.

The circuit board 30 is placed on and supported by the number of protrusion portions 112 of the base plate 11. The locking holes 113 are aligned to the first through holes 31. The bending tabs 213 of the bracket 20 are located on the circuit board 30, and the second through holes 214 of the bending tabs 213 are aligned to the corresponding first through holes 31.

The sliding pole 51 is pressed to slide into the duct 52, causing the limiting block 513 to slide along the inserting portion 528, and the resisting block 516 to pass through the second through hole 214 and the first through hole 31. The third sides 517 are aligned to the corresponding first sides 114, and the fourth sides 518 are aligned to the corresponding second sides 115. The resisting block 516 is passed through the locking hole 113, and the spring 53 is elastically deformed. The first limiting portion 511 resists against the first end of the duct 52, and the second limiting portion 512 resists against the bending tab 213.

When the limiting block is at a distal end of the inserting portion connected to the sliding portion 529, the sliding pole 51 is rotated in the duct 52, causing the limiting block 513 to slide along the sliding portion 529. Simultaneously, the resisting block 516 is rotated in the locking hole 113, causing the third sides 517 to misalign with the corresponding first sides 114. The sliding pole 51 is released, allowing the spring 53 to restore partially elastically to an undeformed state. The resisting block 516 resists against a bottom surface of the protrusion portion 112, and the limiting block 513 resists against a side edge of the sliding portion 529. Thus, the sliding pole 51 is prevented from moving out of the duct 52. The two locking portions 221 are locked in the two cutouts 122, and the bracket 20 is fixed on the enclosure 10 together with the circuit board 30.

To disassemble the bracket 20 and the circuit board 30 from the enclosure 10, the sliding pole 51 is rotated in the duct 52. The limiting block 513 slides back to the inserting portion 528 from the sliding portion 529. The resisting block 516 is rotated in the locking hole 113. The third sides 517 are aligned to the corresponding first sides 114, thereby releasing the sliding pole 51 and fully elastically restoring the spring 53. The sliding pole 51 slides out of the duct 52, and the resisting block 516 moves out of the locking hole 113 and the first through hole 31. Thus, the bracket 20 and the circuit board 30 are disassembled from the enclosure 10.

Even though numerous characteristics and advantages of the present disclosure have been set forth in the foregoing description, together with details of the structure and function of the disclosure, the disclosure is illustrative only, and changes may be made in detail, especially in the matters of shape, size, and the arrangement of parts within the principles of the disclosure to the full extent indicated by the broad general meaning of the terms in which the appended claims are expressed.

What is claimed is:

1. An electronic device enclosure, comprising:
   a base plate comprising a number of protrusion portions;
   a locking hole is defined in each of the number of protrusion portions; the locking hole comprises two opposite first sides and two opposite second sides;
   a bracket;
   a sliding pole slidably mounted to the bracket;
   a resisting block extends from the sliding pole, the resisting block comprises two opposite third sides and two opposite fourth sides;
   a length of each of the two third sides is substantially less than a length of each of the two first sides, the length of each of the two third sides is substantially greater than a length of each of the two second sides;
   a length of each of the two fourth sides is substantially less than the length of each of the two second sides;
   wherein the third sides are aligned to the corresponding first sides; the resisting block is passed through and rotated in the locking hole; the third sides are misaligned to the corresponding first sides; the resisting block is locked in the locking hole; and the bracket is mounted to the base plate.

2. The electronic device enclosure of claim 1, further comprising a bending tab located on the bracket; a second through hole is defined in the bending tab; the second through hole is aligned to the locking hole; and the resisting block is passed through the second through hole and the locking hole in sequence.

3. The electronic device enclosure of claim 2, further comprising a circuit board supported on the number of protrusion portions; the bending tab is located on the circuit board; a first through hole is defined in the circuit board; and the resisting block is passed through the first through hole.

4. The electronic device enclosure of claim 1, further comprising a duct mounted to the bracket; a limiting block protrudes from the sliding pole; the sliding pole slides in the duct; a sliding slot is defined in the duct; and the limiting block is slidable in the sliding slot.

5. The electronic device enclosure of claim 4, wherein the sliding slot comprises an inserting portion and a sliding portion; the limiting block slides downwardly along the inserting portion when the resisting block is passed through the locking hole; and the limiting block slides horizontally along the sliding portion when the resisting block is rotated in the locking hole.

6. The electronic device enclosure of claim 4, wherein the duct comprises two upright portions substantially parallel to each other and a connecting portion connected to the two upright portions; the sliding slot is defined in the connecting portion; a first limiting portion protrudes from an upper portion of the sliding pole; a width between the two upright portions is substantially less than a diameter of the first limiting portion; and the first limiting portion resists against the duct when the resisting block is locked in the locking hole.

7. The electronic device enclosure of claim 6, further comprising a hook positioned on a side edge of each of the two upright portions; a number of locating holes are defined in the bracket; and the hooks are inserted in the corresponding locating holes.

8. The electronic device enclosure of claim 4, further comprising a spring mounted to the sliding pole; an upper portion of the spring resists against the limiting block; and the limiting block compresses the spring when the limiting block slides downwardly along the inserting portion.

9. The electronic device enclosure of claim 1, further comprising a side plate connected to the base plate; a cutout is defined in the side plate; a locking portion is positioned on the bracket; and the locking portion is locked in the cutout.

10. An electronic device enclosure, comprising:
    a base plate comprising a number of protrusion portions;
    a locking hole is defined in each of the number of protrusion portions, the locking hole comprises two opposite first sides and two opposite second sides;
    a circuit board supported on the number of protrusion portions;
    a first through hole is defined in the circuit board;
    a bracket defining a second through hole therein; and
    a sliding pole slidably mounted to the bracket;
    a resisting block extends from the sliding pole; the resisting block comprises two opposite third sides and two opposite fourth sides;
    a length of each of the two third sides is substantially less than a length of each of the two first sides, the length of each of the two third sides is substantially greater than a length of each of the two second sides;
    a length of each of the two fourth sides is substantially less than the length of each of the two second sides;
    wherein the third sides are aligned to the corresponding first sides; the resisting block is passed through the second through hole, the first through hole and the locking hole in sequence; the resisting block is rotated in the locking hole; the third sides are misaligned to the corresponding first sides; the resisting block is locked in the locking hole; and the bracket is mounted to the base plate.

11. The electronic device enclosure of claim 10, further comprising a bending tab positioned on the bracket; the second through hole is defined in the bending tab; the second through hole is aligned to the locking hole; and the bending tab is located on the circuit board.

12. The electronic device enclosure of claim 10, further comprising a duct mounted to the bracket; a limiting block protrudes from the sliding pole; the sliding pole slides in the duct; a sliding slot is defined in the duct; and the limiting block is slidable in the sliding slot.

13. The electronic device enclosure of claim 12, wherein the sliding slot comprises an inserting portion and a sliding portion; the limiting block slides downwardly along the inserting portion when the resisting block is passed through the locking hole; and the limiting block slides horizontally along the sliding portion when the resisting block is rotated in the locking hole.

14. The electronic device enclosure of claim 12, wherein the duct comprises two upright portions substantially parallel to each other and a connecting portion connected to the two upright portions; the sliding slot is defined in the connecting portion; a first limiting portion protrudes from an upper portion of the sliding pole; a width between the two upright portions is substantially less than a diameter of the first limiting portion; and the first limiting portion resists against the duct when the resisting block is locked in the locking hole.

15. The electronic device enclosure of claim 14, further comprising a hook positioned on a side edge of each of the two upright portions; a number of locating holes are defined in the bracket; and the hooks are inserted in the corresponding locating holes.

16. The electronic device enclosure of claim 12, further comprising a spring mounted to the sliding pole; an upper portion of the spring resists against the limiting block; and the limiting block compresses the spring when the limiting block slides downwardly along the inserting portion.

17. The electronic device enclosure of claim 10, further comprising a side plate connected to the base plate; a cutout is defined in the side plate; a locking portion is positioned on the bracket; and the locking portion is locked in the cutout.

* * * * *